(12) United States Patent
Sharifi Mehr et al.

(10) Patent No.: US 10,142,301 B1
(45) Date of Patent: Nov. 27, 2018

(54) ENCRYPTED DATA DELIVERY WITHOUT INTERVENING DECRYPTION

(71) Applicant: Amazon Technologies, Inc., Reno, NV (US)

(72) Inventors: Nima Sharifi Mehr, Vancouver (CA); Darren Ernest Canavor, Redmond, WA (US); Jesper Mikael Johansson, Redmond, WA (US); Jon Arron McClintock, Seattle, WA (US); Gregory Branchek Roth, Seattle, WA (US); Gregory Alan Rubin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/489,161

(22) Filed: Sep. 17, 2014

(51) Int. Cl.
*H04L 29/06* (2006.01)
*H04L 9/08* (2006.01)

(52) U.S. Cl.
CPC ........ *H04L 63/0478* (2013.01); *H04L 9/0816* (2013.01); *H04L 63/0428* (2013.01)

(58) Field of Classification Search
CPC .. H04L 63/20; H04L 63/0471; H04L 63/0428
USPC ....................................................... 713/150
See application file for complete search history.

(56) References Cited

U.S. PATENT DOCUMENTS

| | | | | |
|---|---|---|---|---|
| 5,727,196 A | * | 3/1998 | Strauss, Jr. ....... | G06F 17/30492 707/696 |
| 5,822,400 A | * | 10/1998 | Smith ................. | H04M 3/5158 379/210.01 |
| 7,233,948 B1 | * | 6/2007 | Shamoon ....... | H04N 21/234318 707/999.102 |
| 7,508,945 B1 | * | 3/2009 | Ferre Herrero ....... | H04L 9/0656 380/268 |
| 2002/0114453 A1 | * | 8/2002 | Bartholet .............. | H04L 9/0662 380/44 |
| 2003/0037247 A1 | * | 2/2003 | Obara ..................... | H04L 67/42 713/193 |
| 2003/0219018 A1 | * | 11/2003 | Van Der Burg .... | H04M 3/2254 370/392 |
| 2004/0093396 A1 | * | 5/2004 | Akune .................... | G06F 21/10 709/219 |
| 2004/0107356 A1 | * | 6/2004 | Shamoon ............ | H04L 63/0428 713/193 |
| 2004/0139335 A1 | * | 7/2004 | Diamand ............... | H04N 5/913 713/189 |
| 2004/0184480 A1 | * | 9/2004 | Kangas ................ | H04N 21/235 370/466 |
| 2005/0060547 A1 | * | 3/2005 | Saito ................. | H04L 12/40091 713/171 |
| 2007/0101133 A1 | * | 5/2007 | Liu ..................... | H04L 63/0485 713/168 |

(Continued)

FOREIGN PATENT DOCUMENTS

WO    WO 0241101 A2 *  5/2002  ......... H04L 63/0428

*Primary Examiner* — Haresh N Patel
(74) *Attorney, Agent, or Firm* — David Wright Tremaine LLP

(57) ABSTRACT

Multiple communications that encode data are encrypted for transit from one entity to the other. An entity receiving the communications decrypts at least some of the communications to determine how to process the communications. As part of processing the communications, the entity receiving the communications provides at least some of the encrypted communications to a data storage system without reencrypting those communications.

27 Claims, 7 Drawing Sheets

(56) References Cited

U.S. PATENT DOCUMENTS

| | | | |
|---|---|---|---|
| 2008/0013724 A1* | 1/2008 | Shamoon | H04L 63/0428 380/201 |
| 2008/0091763 A1* | 4/2008 | Devonshire | G06F 9/548 709/201 |
| 2008/0091944 A1* | 4/2008 | von Mueller | G06Q 20/085 713/168 |
| 2008/0137862 A1* | 6/2008 | Morita | G06K 7/10237 380/270 |
| 2009/0067633 A1* | 3/2009 | Dawson | H04L 9/088 380/279 |
| 2009/0169001 A1* | 7/2009 | Tighe | H04L 9/34 380/217 |
| 2009/0190758 A1* | 7/2009 | Pourzandi | G06F 9/468 380/255 |
| 2009/0198713 A1* | 8/2009 | Sato | H04N 5/913 709/217 |
| 2010/0223466 A1* | 9/2010 | Roskowski | H04L 1/1685 713/168 |
| 2010/0260126 A1* | 10/2010 | Ulupinar | H04B 7/2606 370/329 |
| 2010/0313275 A1* | 12/2010 | Ibrahim | G06F 21/88 726/26 |
| 2011/0202755 A1* | 8/2011 | Orsini | H04L 63/029 713/151 |
| 2012/0163597 A1* | 6/2012 | Pan | H04L 9/0891 380/255 |
| 2012/0284506 A1* | 11/2012 | Kravitz | G06Q 40/00 713/151 |
| 2013/0013606 A1* | 1/2013 | Stanfill | G06F 17/30297 707/737 |
| 2013/0129079 A1* | 5/2013 | Swaminathan | H04L 9/0637 380/28 |
| 2014/0317394 A1* | 10/2014 | Buhler | G06F 9/4416 713/2 |
| 2014/0337236 A1* | 11/2014 | Wong | G06Q 20/363 705/71 |
| 2015/0030155 A1* | 1/2015 | Park | H04N 7/1675 380/210 |

* cited by examiner

ENCRYPTED DATA DELIVERY WITHOUT INTERVENING DECRYPTION

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the security of the data they hold can be challenging, especially as the size and complexity of such configurations grow.

Many techniques have been developed to enhance data security. For example, Transport Layer Security (TLS) and other protocols allow secure communications over a network between computer systems using symmetric cryptographic keys. Such protocols, however, are often implemented as a feature additional to other techniques for maintaining data security. As a result, multiple inefficiencies are introduced. For example, in many contexts, the primary goal of a transfer of data is to store data in encrypted form. Use of TLS and other secure communications protocols typically require data to be encrypted for transit over a network, decrypted upon receipt, and reencrypted for storage.

BRIEF DESCRIPTION OF THE DRAWINGS

Various embodiments in accordance with the present disclosure will be described with reference to the drawings, in which.

DETAILED DESCRIPTION

Figure 1:
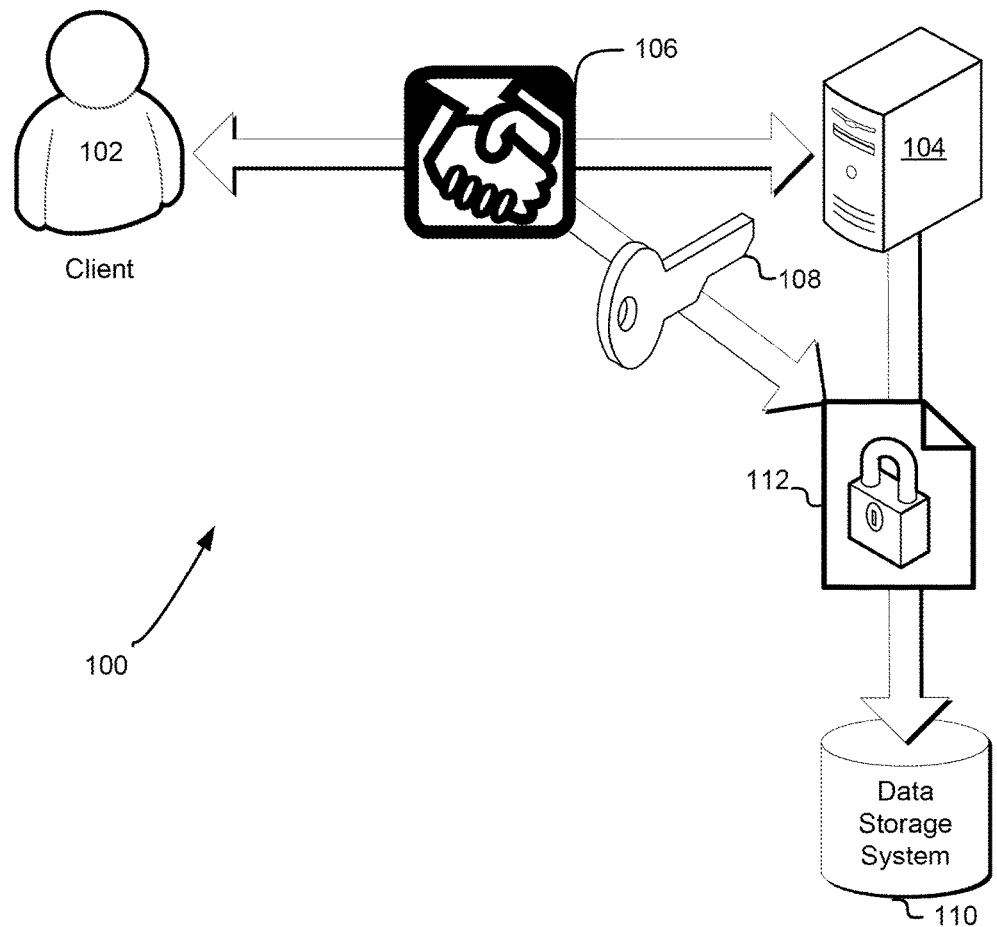
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein increase the efficiency of systems that utilize encryption for the transmission and storage of data. In some embodiments, a server establishes a secure communications channel with a client of the server. As an illustrative example, the server may negotiate a transport layer security (TLS) session with the client to establish a secure channel over which encrypted communications (e.g., TLS records) from the server are decryptable by the client and encrypted communications from the client are decryptable by the server. As part of establishment of the secure communications channel, the client may determine an encryption key and use that encryption key to encrypt communications to the server. For instance, the client may negotiate a set of keys with the server so that, when the client uses its encryption key to encrypt data sent to the server, the server is able to decrypt the data. In some examples, such as when the client and server use a symmetric cryptographic primitive, the server determines a copy of the encryption key and uses the encryption key to decrypt (i.e., as a decryption key). In other examples, such as when the client and server use an asymmetric cryptographic primitive, the client's encryption key and the server's decryption key are different. For example, the client's encryption key may be a public key of a public/private key pair and the server may have a copy of the private key of the pair.

A set of communications from the client to the server may collectively encode a data object in encrypted form. For example, a plurality of TLS records may collectively encode an encrypted request to store a data object provided in the request. In an embodiment, a computer system (e.g., the server or a distributed system in which the server is a component) efficiently stores the data by selectively determining which records to decrypt and, when appropriate, decrypting less than all of the records. As one example, the server may decrypt records until enough records have been decrypted to detect a request header that specifies what to do with a payload of the request. Once enough records to process the request header have been decrypted, the server may refrain from decrypting records that contain a portion of the payload of the request (except, for example, records that contain both part of the header and part of the payload). Encrypted records each containing at least a portion of the payload and collectively containing the complete payload may be transmitted to a data storage system, such as a local storage device and/or a data storage location accessible over a network.

The server may determine which records to leave encrypted in various ways in accordance with various embodiments. For instance, in some embodiments, data that arrives to the server is of a consistent size and/or the client may be configured to transmit data of a consistent size (e.g., using padding to achieve a certain size). Because of the predictability of the size, the server may be programmed to leave encrypted a certain number of records corresponding to the consistent size of the data. In other embodiments, the request header for a storage request specifies information from which the records to leave encrypted can be determined by the server. For instance, the request header may explicitly specify a range of records to leave encrypted or a size of the payload that enables a calculation of which records to leave encrypted or otherwise. In yet other embodiments, the client may provide information that enables the server to determine which records to leave encrypted using a side channel, such as an intermediary computer system or another connection with the server.

To enable the stored data to be decrypted, various embodiments may employ different techniques for management of cryptographic keys. In some embodiments, a client and/or server application is configured to store a key used to encrypt data sent to a server so that the key may be used at a later time to decrypt data that was stored in accordance with techniques described herein. In other embodiments, the client and/or server application is configured to transmit the key to a data storage service to be stored for later retrieval. The application may also send a transmission that causes a database that associates key identifiers with data encrypted under associated keys to update. In yet other embodiments, the application encrypts the key to another cryptographic key (e.g., a public key that has a corresponding private key) so that a system with access to the private key can decrypt the data.

Other variations are also considered as being within the scope of the present disclosure. For example, in some embodiments, the request header includes a hash, digest, or other information that enables validation of the integrity (data integrity information) of one or more data objects to be stored. A server may decrypt all records of a request, including the data to be stored while maintaining a copy of the encrypted records corresponding to the data to be stored in local memory. The data integrity information may be used to validate the data and, on a condition that the data is successfully validated, the server may transmit the stored encrypted records corresponding to the data to be stored to a data storage system for persistent storage. In this manner, even though the server still decrypts all the incoming records, computational resources are nevertheless saved since the data does not need to be reencrypted for persistent storage. As yet another example, a request may specify multiple data objects to be stored. The client may provide information that enables determining a correspondence between data objects and encrypted data records. A server may determine subsets of a set of encrypted data records where each subset corresponds to a respective data object. The subsets may have a nonempty intersection, such as when one record includes both the tail of one sequence of bits forming a data object and the head of another sequence of bits forming another data object.

FIG. 1 shows an illustrative example of an environment in which various embodiments can be implemented. In this example, the environment 100 includes a client 102, a server 104 and a third party computer system 106. In an embodiment, the client 102 is a computer system such as a notebook or desktop computer, a tablet computing device, electronic book reader, mobile device, or other type of computing device including those enumerated below. The client 102 may operate in accordance with a client application such as a browser, mobile application, or other set of executable instructions that cause the client 102 to communicate with the server 104 and the third party 106 such as described in more detail below.

The server 104 may be a server computer system and may include one or more server applications. Similarly, the third party computer system 106 may be a server computer system such as the server computer system 104. It should be noted that the third party 106 may be a third party to the communications between the client 102 and server 104, and that the third party is not necessarily controlled, managed, hosted, or otherwise operated by an entity different than an entity that operates the client and/or an entity that operates the server 104. Generally, some or all of the entities illustrated in FIG. 1 may be operated by, owned by, and/or hosted by the same party.

The client 102, server 104, and third party 106 may communicate over a network such as the Internet. It should be noted that various types of communications in various types of networks, including those discussed below, may also be used. For example, in some embodiments, communications between a pair of entities shown in FIG. 1 occur over a public communications network such as the Internet, and communications between another pair of entities in the environment 100 illustrated in FIG. 1 occur over another channel, such as a local area network or use a short-range communications protocol to establish a short-range communication channel. The short-range communication channel may be established using various technologies, such as induction wireless, infrared wireless (such as technologies operating according to specifications and protocols provided by the Infrared Data Association or IrDA), or ultra wideband formats. In some embodiments, the first and second devices may utilize short-range, low-power, and high-frequency radio transmissions, such as Bluetooth®. In still other embodiments, the first and second devices may support acoustic-based data transfer. For example, the second device may include software components and a speaker that enable the second device to broadcast data to the first device as sound waves, while the first device may include software components and a microphone that enable the second device to receive the data embedded in the sound waves. Thus, one or more of a radio signal-based data transfer (e.g., near field communication (NFC) or Bluetooth®), a light-based data transfer (e.g., infrared data transfer), an acoustic-based data transfer (e.g., sound wave-embedded data), or a magnetic field-based transfer (e.g., reading data from a magnetic stripe) may be used for inter-device communication. The protocols and components for enabling computing devices to perform the systems and methods of the present disclosure by using such mechanisms for inter-device communication are well known to those skilled in the art of computer communications and thus, need not be described in more detail herein. Generally, embodiments described herein are not limited to those explicitly illustrated herein.

Turning to aspects of the present disclosure illustrated in FIG. 1, in an embodiment the client 102 performs a handshake process 106 with the server 104. In some embodiments the handshake process 106 is in accordance with a TLS protocol such as defined in Request for Comments (RFC) 5246, RFC 2246, RFC 4279, and RFC 6176, which are incorporated herein by reference. The version of the TLS protocol used may be version 1.0, 1.1, 1.2, or 1.3 or a variation thereof (such as a subsequent version). Other protocols such as secure sockets layer (SSL) and other protocols implemented below the application layer of the Open Systems Interconnect (OSI) model may also be used and/or adapted to utilize techniques described herein. The handshake process 108 may be used by the client 102 and the server 104 to negotiate a set of security parameters (referred to briefly as "security parameters) for establishment of a secure channel over which communications may be encrypted. It should be noted that the techniques described herein are adaptable to other protocols such as the Real Time Messaging Protocol (RTMP), the Point-to-Point Tunneling Protocol (PPTP), the Layer 2 Tunneling Protocol, various virtual private network (VPN) protocols, and other protocols, such as protocols for secure communication that include a handshake.

Performance of the handshake process 106 enables the server 104 to determine a cryptographic key 108 that is usable to decrypt communications from the client 102. As noted above, the cryptographic key 108 may be a symmetric cryptographic key to which the client 102 also has access or may be a private key of a public/private key pair where the client 102 uses the public key of the public/private key pair to encrypt communications. The server 104 uses this cryptographic key 104 to selectively decrypt communications (e.g., TLS records where TLS is used to establish the secure communications channel). The server 104 selectively decrypts communications to determine how to process communications that have yet to be received and/or decrypted. In some examples, the server 104 selectively decrypts communications to determine that a sequence of communications corresponding to a single request should all be decrypted. In other examples, the server 104 selectively decrypts communications to determine that a subsequence of communications should be left encrypted. As noted above, in some other examples the server 104 selectively decrypts all communications transmitted over the secure communications channel, but temporarily stores (e.g., in volatile memory) a copy of some encrypted communications (i.e., encrypted as received) and selectively accesses encrypted communications and transmits the communications to a data storage system 110, which may be a local storage device, a network-accessible storage device, a distributed system that implements a data storage service and/or other data storage systems.

As illustrated in FIG. 1, the server transmits data 112 to the data storage system 110. In some examples, the data 112 is a sequence of communications (e.g., TLS records) corresponding to a single request from the client 102, such as a hypertext transfer protocol (HTTP) request or other request. In some embodiments, the data 112 comprises all communications that collectively encode the request. In other embodiments, the data 112 comprises a subsequence of a sequence of communications that collectively encodes the request. The subsequence may, for example, comprise the set of communications that include any data from a payload of the request, which may contain a data object or set of data objects to be stored. In some examples, such as when the data 112 encodes multiple data objects, the data 112 may be divided into multiple objects, each containing a subset of the data objects that were received from the client 102 in a request.

Figure 2:
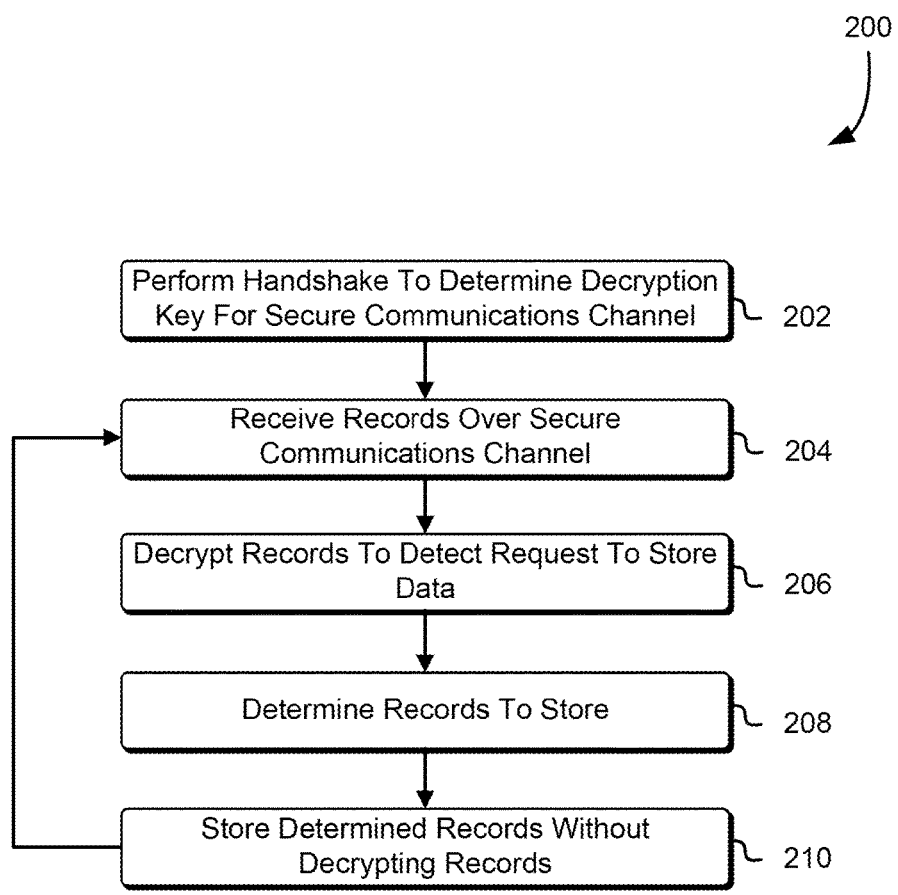
FIG. 2 shows an illustrative example of a process for storing data in accordance with an embodiment.

FIG. 2 shows an illustrative example of a process 200 for storing data. The process 200 may be performed by any suitable system such as by the server 104 described above in connection with FIG. 1. It should be noted however that the process 200 may be performed by any suitable computer system that is operable to receive data such as over a network. In an embodiment the process 200 includes performing 202 a handshake to determine a decryption key for a secure communications channel. The handshake may be, for example, a process that involves a cryptographic key exchange as part of a communications protocol such as TLS such that the system performing the process 200 is able to determine a decryption key to decrypt communications from another entity participating in the handshake. The decryption key that is determined may vary in accordance with various embodiments and generally may vary in accordance with the specific cryptographic primitive or primitives that were used for the handshake. As noted above, for example, the decryption key may be a symmetric cryptographic key that is accessible to another entity involved with the handshake that was performed 202. Also, as noted above, a decryption key may be a private key of a public private key pair. Example cryptographic primitives are listed in more detail below.

When a system performing the process 200 has determined a decryption key for the secure communications channel, communications received by the system performing the process 200 may be decrypted using the decryption key. Accordingly, as illustrated in FIG. 2, the process 200 may include receiving 204 records over the secure communications channel. The records may be, for example, records of a TLS record protocol. It should be noted that while the specification uses the term "records," the term record is not intended to limit embodiments of the present disclosure to protocols that name communications as records. Generally, unless otherwise explicitly stated or contradicted by context, the term record is intended to cover any type of communication that may be transmitted from one entity to the other. Example records may be referred to in some contexts as datagrams, packets, on in other ways which may depend on the particular protocol being used.

As records are received 204, a system performing the process 200 may decrypt 206 records that have been received to detect a request to store data. Generally, a system performing the process 200 may receive many types of communications over the secure channel that was established. Some of the communications may be specific to a protocol used to establish the secure channel. Other messages may, for example, encode requests that are formatted in accordance with another protocol. As an illustrative example, a process performing the process 200 may have used TLS to establish the secure communications channel. Records sent over the secure communications channel may collectively encode a request formatted in accordance with another protocol such as HTTP. The protocol used to encode the request may be a protocol of a different layer of an abstraction model of a communications system, such as the OSI model. Generally, the request may be encoded in the records in any way by which a system performing the process 200 is operable (e.g., by having been programmed) to process the requests.

When a system performing the process 200 detects a request to store data the process 200 may include determining 208 a set of records to store. As an example, the system performing the process 200 may decrypt a sufficient number of records to determine that the records collectively encode a request, and the decrypted records may correspond to a header of the request that specifies parameters for the request to be performed. The process may determine 208 the records to store based at least in part on information that was obtained in the decrypted 206 records. For example, the decrypted records may explicitly specify or otherwise indicate which records have at least some portion of a payload of the request where the payload of the request may comprise data to be stored, such as one or more objects of data to be stored. As another example, the decrypted records may indicate which records correspond to the request and the system performing the process 200 may determine that all records associated with the request are to be stored.

It should be noted that the records that a computer system performing the process 200 determines 208 to store may include one or more records that the computer system has already received and/or one or more records that the computer system has yet to receive because, for example, such records have not been transmitted yet or because such records have yet to cross a network over which the records are transmitted. For example, records corresponding to a header of a request may be received by a computer system performing the process 200 first, and depending on the speed at which records of the request are received, the computer system performing the process 200 may process the header of the request by decrypting records corresponding to the header of the request before some records that are part of the request are received by the computer system. Once the computer system performing the process 200 has determined 208 which records to store, the computer system may store 210 the determined records without decrypting those records or, generally, in the encrypted form in which they were received. For example, a computer system performing the process 200 may send the records to a data storage system as those records were received.

As with all processes described herein, variations of the process 200 are considered as being within the scope of the present disclosure. For example, as noted above, the process 200 may be performed using various protocols and combinations thereof. As another example, in some embodiments the process 200 may include decrypting all records associated with a request but nevertheless storing records of the request in the manner by which they were received. As an illustrative example, a computer system performing the process 200 may decrypt all records associated with the request in order to verify integrity of data (e.g., that the data received matches the data transmitted, without having been modified in transit or otherwise modified) in the request but may store encrypted records that were received without reencrypting those records. As yet another example, a request detected in decrypted records may indicate HTTP chunked transfer encoding or another request where the amount of data of the request is not specified in the request header. In such embodiments, the process 200 may include additional operations, such as selectively decrypting records to locate a chunk of length zero or other indicator of an end to the data to be stored as a result of fulfillment of the request. Another such indicator may be, for example, a request header for a new request or another message that is not part of the request that was previously detected. For instance, a system performing the process 200 may selectively decrypt records (e.g., every $n^{th}$ subsequence of length m, where "n" and m are positive integers, one or both of which may be greater than one) to locate an indicator of an end of a request. Once a record indicating an end of the request is located, the system may decrypt records forward and/or backward in the sequence to decrypt the full indicator to thereby enable a calculation of which records contain data of the request to be stored. Other variations are also considered as being within the scope of the present disclosure.

Figure 3:
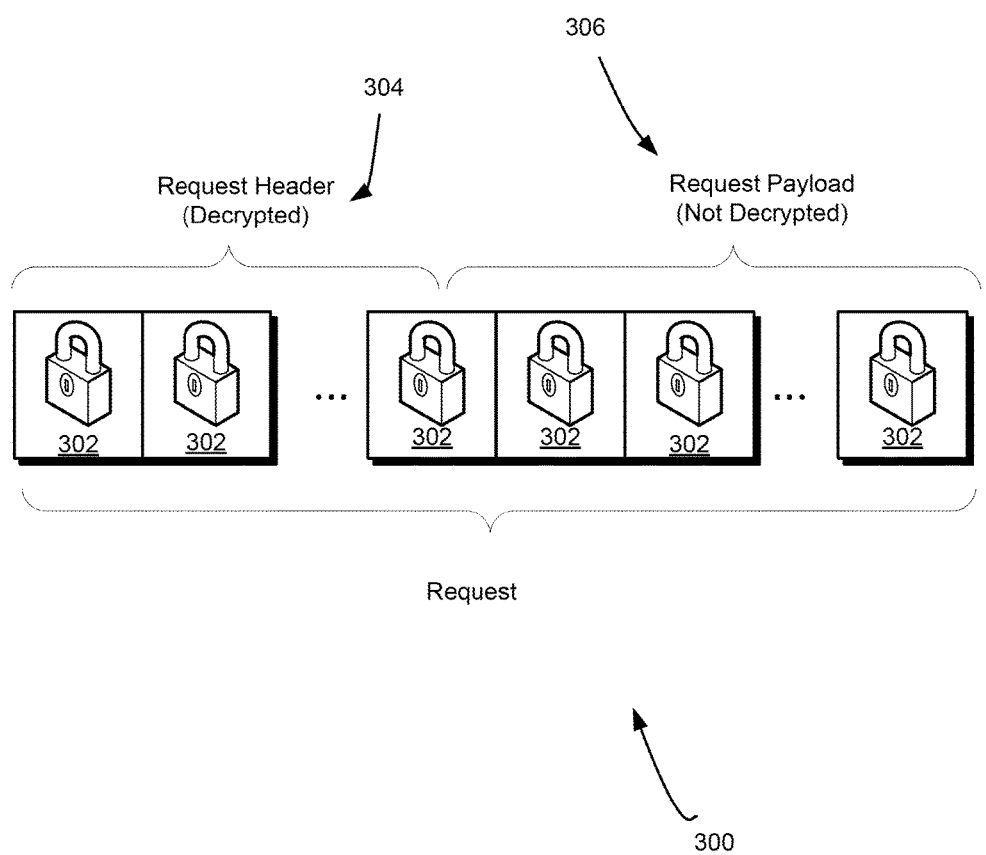
FIG. 3 shows an illustrative example of a sequence of communications in accordance with an embodiment.

FIG. 3 shows an illustrative example of a request 300 in accordance with an embodiment. As illustrated in FIG. 3, the request may be encoded in a sequence of records 302. As illustrated in FIG. 3, the sequence of records 302 of the request 300 may include a plurality of subsequences where each subsequence corresponds to a different portion of the request 300. In this particular example, the request 300 includes a first subsequence that corresponds to a request header 304. A second subsequence of the request 300 corresponds to a request payload 306. In this example, the first subsequence and the second subsequence are distinct (i.e., at least one of the first subsequence and second subsequence has a record that is not in the other of the first subsequence), although in some embodiments, the first subsequence and second subsequence are not necessarily distinct. The request header 304 may encode information about the request, such as a type of the request and/or one or more parameters of the request. As noted above, the request header may also include information that enables determining which records 302 correspond to the request payload 306. The information that is usable to determine the request payload 306 may be configured in various ways in accordance with various embodiments, and the way by which such information is encoded may depend upon the protocol in accordance with which the request 300 is formatted. In some embodiments the request header 304 includes a field that explicitly specifies which records 302 contain data of the request payload 306. In other examples, the request header 304 includes information that does not explicitly indicate which records 302 contain data of the request payload but that can be used to calculate which records 302 contain data of the request payload 306. For example, in some embodiments, the request header 304 specifies a size of the request payload 306 which enables a computer system, utilizing various techniques described herein, to calculate which records 302 correspond to the request payload 306. As another example, the request header may specify chunked transfer encoding, which indicates to a server computer system that additional decryptions may be necessary to determine an end of data for the request, if the client does not provide such information explicitly (e.g., in a field of the request header).

The information in the request header 304 that is usable to determine which records 302 correspond to the request payload 306 may also vary as to the manner in which the request 300 is formatted and/or the protocol in which the records 302 are configured. For example, records 302 may have corresponding identifiers which may be a sequence number or other information that enables distinguishing records from one another, such as transmission and/or reception time stamps. Such identifiers of the request header may be used to determine which records 302 contain data of the request payload. For example, if the request 300 is formatted as illustrated in accordance with FIG. 3, the last record 302 of the request header may also correspond to the first record of the request payload and information included in the request header 304 may be used to determine the last record 302 of the request payload and the range of records between the first record 302 and the last record 302 of the request payload 306 may be determined to be those of the request payload 306.

As illustrated in FIG. 3, a record may contain data from multiple components of the request 300. As illustrated in FIG. 3, for example, the last record 302 of the request header 304 may contain data from the request payload 306. For example, the end of the request header 304 may be followed immediately by the beginning of the request payload 306. As such, a record 302 with data from multiple components of the request 300 may correspond to each component of those multiple components. A computer system, utilizing various techniques described herein, upon receiving records of the request header 302 may decrypt the records 302 until the computer system has obtained enough information to determine parameters for the request 300. When the system decrypts records 302 of the request header and determines which records 302 correspond to the request payload 306, the system may do various things in accordance with various embodiments. For example, as illustrated in FIG. 3, the system may leave the records 302 of the request payload 306 encrypted and may provide the records 302 of the request payload 306 in encrypted form to a data storage system for storage.

It should be noted that records in encrypted form that are sent to the data storage system may also be decrypted, such as records that contain both information of the request header 304 and information from the request payload 306 and generally records that contain information from multiple components of the request 300. As an illustrative example, the last record 302 of the request header 304 which also corresponds to the first record of the request payload 306 may be decrypted by a system processing the request 300. The system, however, may maintain a copy of the encrypted record 302 that is the last record 302 of the request header 304 and may access that record 302 for inclusion with the record 302 of the request payload. In this manner, the system both decrypts the record 302 and transmits the record 302 with the request payload 306 without reencrypting the record 302. In other embodiments, a client computer system may utilize padding (e.g., adding additional zeroes to a sequence of bits) to cause records to only contain data from a respective component (e.g., so that a single record does not contain both part of the header and part of the payload. A server may be configured to take such padding into account when processing the records.

Numerous variations of the request 300 are considered as being within the scope of the present disclosure. For example, FIG. 3 illustrates a request 300 where a first subsequence of the request 300 corresponds to a request header 304 and a second subsequence of the request payload 306 make up the request 300. The request 300 may include additional components before and/or after the request payload 306. Accordingly, techniques described above in connection with the request header 304 and the request payload 306, such as processing of records 302 that include information from both the request header 304 and the request payload 306, may be used where appropriate, such as for a request 300 that includes additional records 302 after the request payload 306.

Further, the records 302 may encode the request in various ways in accordance with various embodiments. For example, the request 300 corresponds to a sequence of bits. Subsequences of the sequence of bits may be encoded sequentially in a sequence of records 302. However, other techniques may also be used to encode a request in a sequence of records. For example, the sequence of bits forming the request may be divided into distinct subsequences and the subsequences may be permuted. The permuted subsequences may be encoded in a sequence of records. In such embodiments, additional techniques may be employed to enable determination of which records correspond to which components of the request. For example, a client computer system indicates how the subsequences of the sequence of bits forming the request have been permuted. In another example, a system processing the request may simply decrypt records, including decrypting records of the request payload, until all the records corresponding to the request header have been identified, thereby enabling determination of which records correspond to the request payload. Other variations are also considered as being within the scope of the present disclosure.

Figure 4:
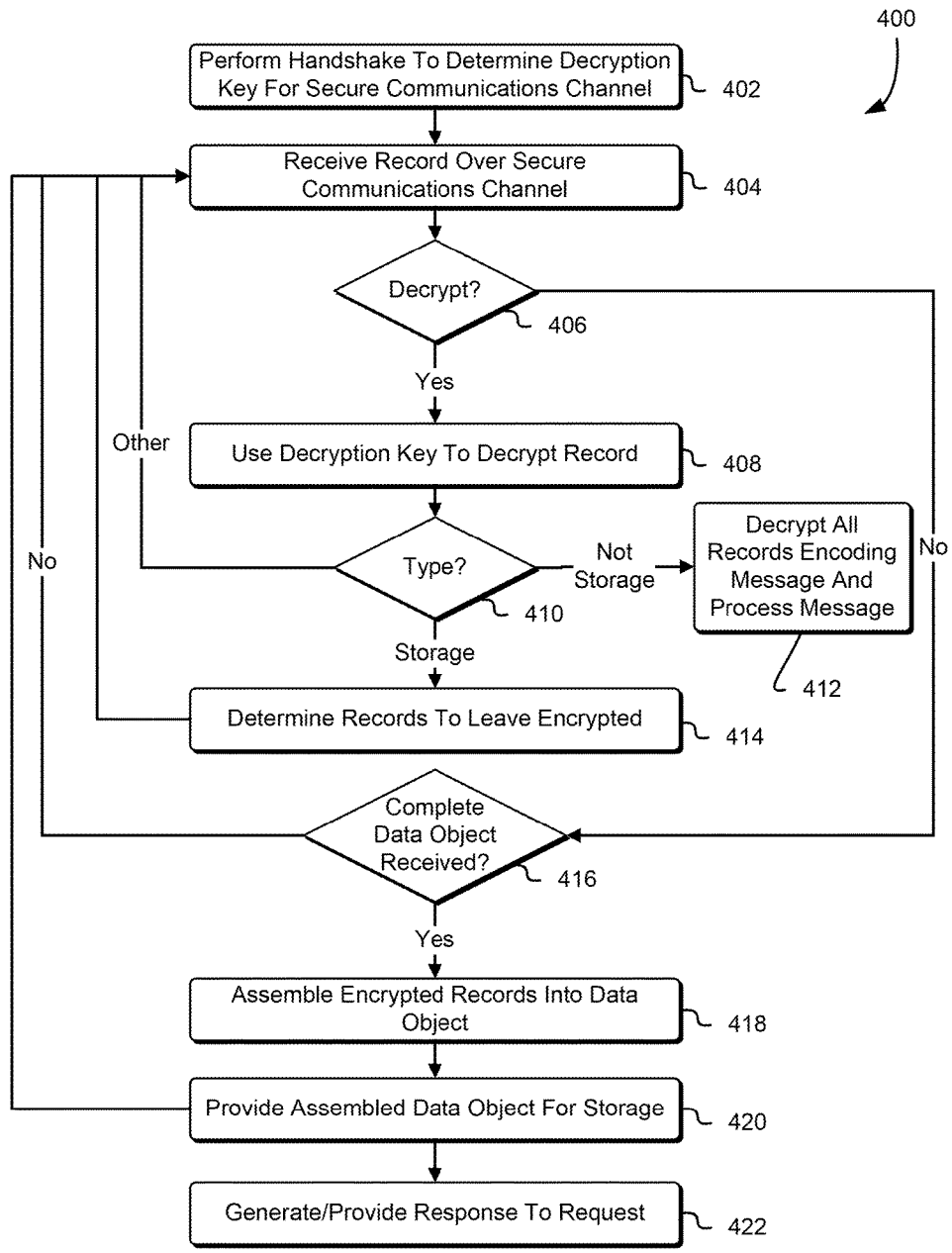
FIG. 4 shows an illustrative example of a process for processing a request in accordance with an embodiment.

FIG. 4 shows an illustrative example of a process 400 for processing a request in accordance with an embodiment. The process 400 may be performed by any suitable system such as a server described above. In an embodiment, the process 400 includes performing 402 a handshake to determine an encryption key for a secure communications channel. As noted, the handshake may be in accordance with a handshake protocol for establishing a secure communications channel over which a record protocol may be used for secure communications. A handshake may be, for example, a TLS handshake. It should be noted that other information may also be determine when performing 402 the handshake. For example, some protocols include the determination of multiple keys such as a key used for encryption, a key used for decryption, a key used for digitally signing data, and a key used for verifying a digital signature of data. Performance 402 of the handshake may also include performance of a cryptographic key exchange such as according to an algorithm mentioned below.

Once the secured communications channel has been established by performance 402 of the handshake, a system performing the process 400 may receive 404 a record over the secure communications channel. The record may be received, for instance, over a network in embodiments where the secure communications channel is configured for network communications. It should be noted that additional operations may also be performed although such operations are not necessarily illustrated. For example, a received 404 record may be placed into a buffer and subsequently accessed from the buffer to be processed, such as described in more detail below. Records may be accessed from the buffer in a first-in-first-out basis or otherwise, such as in accordance with a sequence number or timestamp on the record.

The system performing the process 400 may determine 406 whether to decrypt the record that was received 404. For example, as noted above a determination 406 whether to decrypt may depend on what the computer system has already determined about the received 404 record. If, for example, the computer system has determined that the received 404 record is part of a payload of a request, the system may decide to not decrypt the record in some embodiments. Similarly, if the system has not determined whether the received 404 record corresponds to the payload of a request, the system performing the process 400 may determine 406 that the record that was received 404 should be decrypted. When the system performing the process 400 determines 406 that the record received 404 over the secured communications channel should be decrypted, the system may use 408 the decryption key to decrypt the record. When the record has been decrypted, the system may determine 410 what type of communication the received 404 record is a part of. For instance, a storage request may be one of many types of requests and other communications that the system may be operable to process.

In the example of FIG. 4 there are three possible outcomes to the determination 410 of the type of communication. In some examples, the system lacks sufficient information to make the determination 410 and the type is determined 410 to be "other." For instance, an insufficient number of records may have been decrypted to determine what type of message is encoded by incoming records. As another example, the system may have enough information as to whether a storage request has been received and accordingly the determination may be that a storage request was received or that a storage request was not received. If the system performing the process 400 determines 410 that insufficient information for the determination 410 is available (i.e., that the communication type is "other,") the process 400 may include receiving 404 another record over the secure communications channel. The process 400 may repeat, as illustrated in FIG. 4 and described above, until the system determines 410 that a storage request was received or not received.

It should be noted that the three types of outcomes illustrated in FIG. 4 are examples and that different embodiments may have a different set of outcomes. For example, there may be different types of storage requests that require different operations for processing. As one example, in some embodiments, some storage requests may employ techniques of the present disclosure while other storage requests may be processed using different techniques. For instance, information in a request header may specify whether to employ techniques of the present disclosure (e.g., by transmitting data to storage without reencryption and/or avoiding decryption of certain records).

Returning to the illustrated embodiment, if it is determined 410 that a storage request was not received (i.e., the communication was of a type of "not storage"), the process 400 may include decrypting 412 from all records a message and processing the message. The request may be, for example, a request for the system performing the process 400 to process where the request is not a storage request. As another example, the records that were received 404 may correspond to a message of the protocol used for the secure communications channel. Generally, the way by which the message that the records collectively encode may be processed in various ways in accordance with various embodiments and in dependence on the message that the records encode.

If it is determined 410 that the system performing the process 400 has received a storage request (i.e., the communication was of a type of "storage"), the process 400 may include determining 414 records to leave encrypted. The records to leave encrypted may be determined 414 in various ways in accordance with various embodiments such as described above. For example, the records that have been received 404 so far may collectively encode a request header which specifies a set of parameters for the request. The parameters may include information from which records corresponding to a payload of the request that is data to be stored in fulfillment of the storage request may be determined. Examples of ways to determine which records to leave encrypted are discussed above.

Once the system performing the process 400 determines 414 which records to leave encrypted, the system may nevertheless still receive 404 additional records over the secure communications channel. As illustrated in FIG. 4, when additional records are received the system performing the process 400 may determine 406 to not decrypt some of the records that are received 404. When a record is received 404 and the system determines 406 to not decrypt the record, the system performing the process 400 may further determine 416 whether a complete data object has been received. If the system determines 416 that a complete data object has not been received, the process 400 may include receiving 404 an additional record such as described above. The process 400 may repeat, as illustrated in FIG. 4, as records that are left encrypted are received 404 until it is determined 416 that a complete data object (or, generally, the complete request) has been received.

When it is determined 416 that a complete data object has been received, the process 400 may include assembling 418 the encrypted records into a data object. The data object that is assembled 418 may comprise the encrypted records that were received 404 as described above. The encrypted records may be, for example, organized in a sequence in accordance with a sequence numbering of the records or another ordering which has been determined. It should be noted that an ordering may be determined at a later time such as when the data object is decrypted at a future time, if it is ever decrypted. The records may be assembled 418 in other ways in such embodiments such as randomly or in an order in which the records were received.

When records have been assembled 418 into a data object, the process 400 may include providing 420 the assembled data object for storage. The assembled data object may be provided 420 for storage by transmitting the assembled data object to a data storage system. The assembled data object may be provided in various ways, depending on the data storage system that is being used. In some examples, a small computer system interface (SCSI) command or other command in accordance with a protocol for communicating with a local storage device is transmitted to a data storage device that is local to the system performing the process 400. As another example, an Internet SCSI (iSCSI) command is transmitted over a network to a network accessible data storage device. As yet another example, an application programming interface request to store the assembled data object is transmitted to a data storage system that provides an interface through which such requests may be submitted. The interface may be, for example, a web service interface of a service provider that provides data storage as a service. Generally, any way by which data may be transmitted from the system performing the process 400 to a data storage system is considered as being within the scope of the present disclosure.

When the assembled data object has been provided 420 for storage a response to the request may be generated and provided. The response may be, for example, a communication conforming that the assembled data object has been stored. As illustrated in FIG. 4, the process 400 may repeat for different requests and other records that are received 400, such as illustrated in FIG. 4 as a computer system configured to perform the process 400 receives records over the secure communication channel.

As with all processes described herein, variations are considered as being within the scope of the present disclosure. For example, FIG. 4 illustrates a process in which records are processed as they are received. In various embodiments, a system performing a process such as the process 400 for processing records, may receive records and place the records in a buffer. Instead of processing the records as they are received, the system performing the process may process records in the buffer such as by utilizing the buffer as a queue. In addition, numerous additional operations may be performed when performing the process 400. As noted above, various embodiments of the present disclosure involve management of the decryption key to enable use of the decryption key at a later time for the decryption of the data object. In some embodiments, the decryption key is stored with the data object in the data storage system or in another data storage system. For enhancing security, the decryption key may be stored in encrypted form. In some embodiments, that decryption is encrypted using a public key of a public/private key pair where the private key is accessible to an entity authorized for decrypting the data object. The entity may be, for example, a client computer system that transmitted the records that were received 404. A symmetric key may also be used to encrypt the decryption key such as, for instance, when the system performing the process 400 has access to such a symmetric cryptographic key. In some examples, an identifier is assigned to the data object and the decryption is stored in plain text or in encrypted form in a database in association with the identifier of the data object to enable the decryption key to be determined by querying the database at a later time.

As noted above, variations in the manner by which the received records are processed are also considered as being within the scope of the present disclosure. In some examples, for instance, the encrypted records that are assembled 418 into the data object comprise only those records that contain at least a portion of the data object. In other embodiments, the encrypted records include all of the records containing at least a portion of the storage request. As yet another example, a request may include a tail component or multiple tail components after its payload and records containing information from a tail component, but lacking information from the payload, may be discarded. In some embodiments, the decryption key is encrypted and provided in a response to the storage request. Other information that enables determination of the decryption key may be used. For instance, the communications of a handshake may be stored (e.g., in encrypted form) for some types of handshakes. Further, as discussed above, a system performing the process 400 may include additional operations relating to the validation of the integrity of the data object that was received in the encrypted records. For example, the system may decrypt all records of the storage request and verify the validity of the data in plain text form, but having a locally stored copy of the encrypted records corresponding to the data object, may provide the encrypted records to storage.

Figure 5:
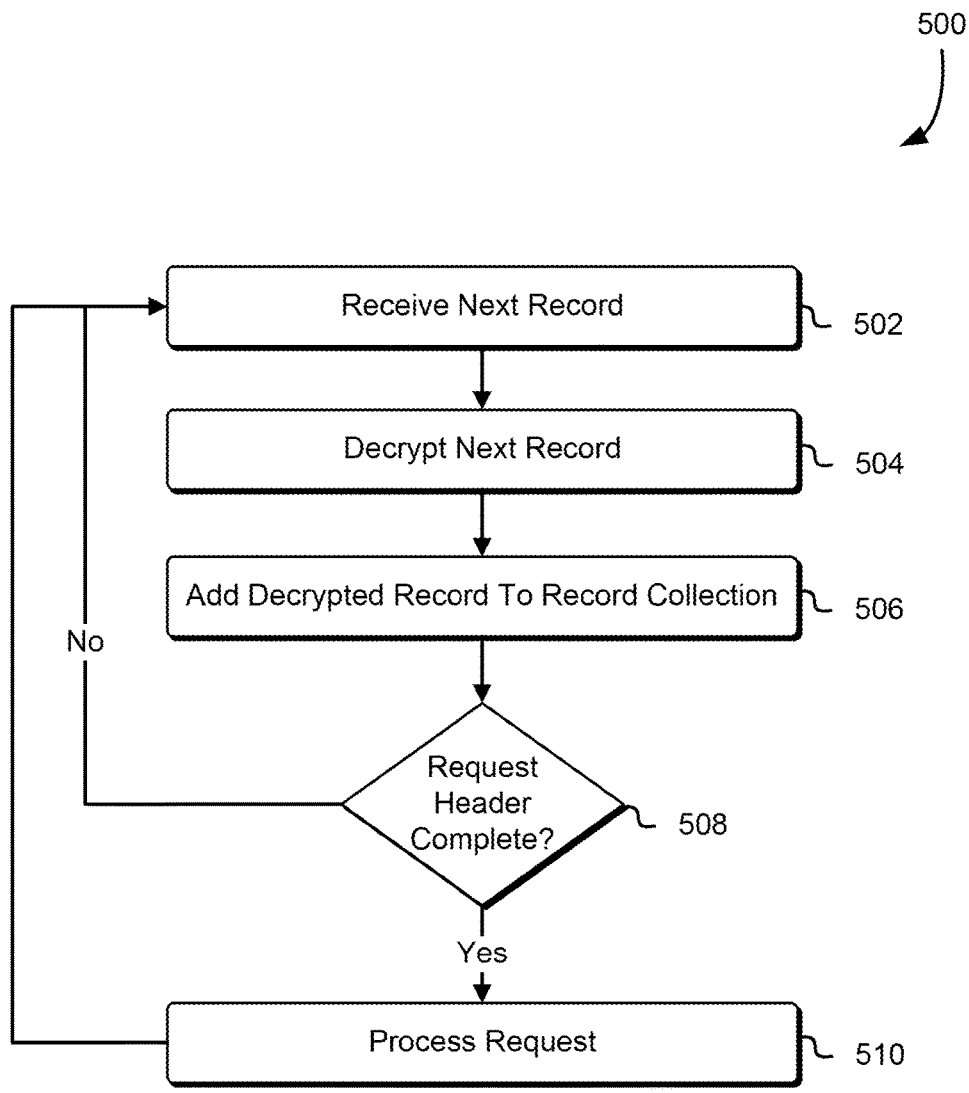
FIG. 5 shows an illustrative example of a process for processing a request in accordance with an embodiment.

As discussed above, a system utilizing various techniques described herein may selectively decrypt records received over a secure communications channel to determine information about a request that is encoded collectively by the records that are received. FIG. 5 accordingly shows a process for processing a request in accordance with an embodiment. The process 500 may be performed by any suitable system, such as by a server such as described above. The server may, for example, be the server that performs the process 400 described above and the process 500 may be integrated into the process 400 of FIG. 4. Turning to the specifics of FIG. 5, in an embodiment, the process 500 includes receiving 502 a next record. The next record may be, for example, the first record received after establishment of the secure communications channel or a record received later. As noted, the record may also be received from a buffer in which received records are temporarily stored.

The next record that was received may be decrypted 504 using a decryption key that was determined during establishment of the secure communications channel or otherwise that is available to the system performing the process 500 (e.g., as a pre-shared key). When the record is decrypted the decrypted record may be added 506 to a record collection. The record collection may be a collection of decrypted records stored by the system performing the process 500. The collection may be stored, for example, in volatile computer system memory of the computer system. The record collection may comprise the decrypted records so as to maintain a collection of the records that have been decrypted until a sufficient number of records are decrypted to determine how to process a request that is encoded collectively by a plurality of records. A record may be added to the collection in accordance with an ordering (e.g., determined by a sequence numbering of the records or timestamps of the records) so that, when added, the record is in compliance with the ordering.

As records are added to the record collection, the process 500 may include determining 508 whether it has received a complete request header. For example, the records in the record collection may be assembled in order in decrypted form to enable the computer system performing the process 500 to determine whether a complete set of records containing the request header has been received. If it is determined 508 that the records that have been received do not form a complete request header, the process 500 may include receiving 502 the next record. The next record may be decrypted and added to the record collection, at which point another determination may be made 508 whether the request header is complete. The process 500 may repeat as illustrated in FIG. 5 until it is determined 508 that the request header is complete.

When determined 508 that the request header is complete, the process 500 may include processing 510 the request in accordance with the request header. The request may be processed 510 in various ways in accordance with various embodiments such as described above. For example, as the process 500 is performed, additional records may be received and the request may be processed by using the request header to determine which of those records to leave encrypted and/or to transmit to a data storage system in encrypted form. Accordingly, processing 510 the request may include determining whether decrypt additional records that are received and determining which of the additional records should remain encrypted and/or which records should be transmitted to the data storage system in encrypted form.

Other variations in which the request may be processed, such as those described above, are also considered as being within the scope of the present disclosure. For instance, in some examples, a request specifies multiple data objects to be stored. Processing the request may include identifying which records correspond to which data objects and assembling subsets of a set of records into subsets that individually correspond to respective data objects. As another variation considered as being within the scope of the present disclosure, variations include those in which a request header is not required to complete before a system performing the process 500 can process the request. As an example, a request header may include many fields of information. Only a proper subset of such fields may be sufficient for determining how to process a request. Accordingly, instead of determining 508 whether the request header is complete, the computer system performing the process 500 may determine whether it has sufficient information for processing the request. Some records of the request header may not be decrypted in such embodiments as decryption may not provide the computer system information necessary for processing the request. Other variations are also considered as being within the scope of the present disclosure.

Figure 6:
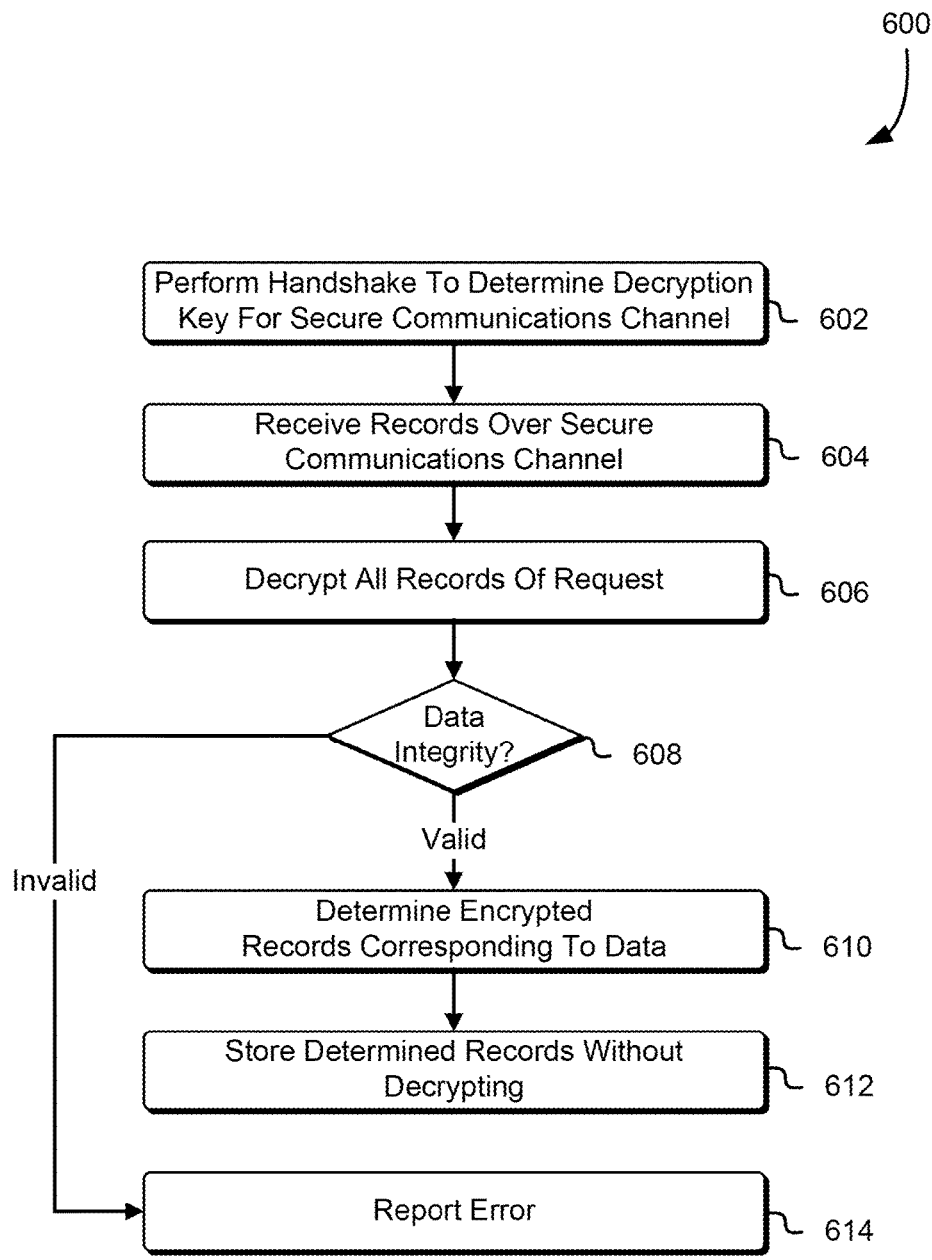
FIG. 6 shows an illustrative example of a process for storing data while validating integrity of the data in accordance with an embodiment.

As noted above, variations of the techniques described herein include variations in which the integrity of data is verified as part of utilization of the techniques described herein. FIG. 6 accordingly shows an illustrative example of a process for processing a storage request in accordance with an embodiment. The process 600 may be performed by any suitable system such as a server described above. In an embodiment, the process 600 includes performing 602 a handshake to determine a decryption fee for a secure communications channel such as described above. When the secure communications channel has been established by performance 602 of the handshake, the process 600 may include receiving 604 records over that secure communications channel. A system performing the process 600 may simply decrypt 606 all records of the request instead of selectively determining which records to decrypt while leaving some records encrypted.

Once all records of the request have been decrypted, or at least all records of the request sufficient for validating the integrity of the data encoded in the request for storage, the process 600 may include determining 608 the integrity of the data. The integrity of the data may be determined 608, for instance, by calculating a hash of the data where the hash value may be encoded in the field of a request header. In some examples, the handshake process that was performed 602 may include determination of a data integrity validation key and the data integrity validation key may be used to determine whether the integrity of the data is valid. In this manner, a system performing the process 600 can determine whether any errors were introduced by encryption and/or transmission of the data.

If it is determined 608 that the integrity of the data is valid, the process 600 may include determining 610 the encrypted records corresponding to the data to be stored. As discussed above, information in the request header may allow the computer system to selectively determine which of the records of the request correspond to a payload of the request that contains the data to be stored. The determined records may be stored 612 in encrypted form, that is, without decrypting. As noted above, those records have already been decrypted in performance of the process 600; however, the system performing the process 600 may maintain a copy of at least the records corresponding to the data to be stored and may access those copies for transmission to a data storage system. In this manner, while the computer system performing the process 600 utilizes its computational resources for the decryption of the records that were received over the secure communications channel, an efficiency is nevertheless gained because the system performing the process 600 is able to transmit records corresponding to the encrypted data in encrypted form without having to use additional computational resources for the encryption of those records.

If it is determined 608 that the integrity of the data is invalid, the process 600 may include reporting 614 an error, which may include transmitting a message over the secure communications channel indicating that the integrity of the data has not been verified, thereby enabling another entity participating in the secure communications channel to take corrective action, such as by re-encoding the data into records for transmission.

As discussed above, numerous variations of the techniques described explicitly herein are considered as being within the scope of the present disclosure. In comparison to the technique illustrated in FIG. 6, for example, variations of the present disclosure include those where integrity of data encoded in a request is validated without decryption of at least some records that encode the data. As an example, the Galois Counter Mode of the Advanced Encryption Standard (AES-GCM) may be used to validate the integrity of the data without decryption, although techniques for data integrity validation are not limited to that particular cryptographic algorithm.

For example, for the purpose of illustration, the various techniques described above use explicit examples of protocols used for the transmission of data over a network. The techniques described herein, however, may be used in other contexts where a network is not necessarily present or where a network that is used is a virtual network. As one example, a secure communications channel may be established between two entities of a same computer system. In a virtualization context, for example, a secure communications channel may be established between two virtual machines implemented by the same hardware device. This secure communications channel may be established using an overlay network where communications travel from one virtual machine to the other, without requiring the transmission of data outside of the hardware device that implements the virtual machines. Hypercalls or other mechanisms may be used to transmit data between virtual machines implemented in such a virtualization context.

As another example of a variation considered as being within the scope of the present disclosure, techniques described herein are applicable to intra-process communications. A communications channel may be established between two processes executing on a computer system. The techniques described herein may be adapted such that one process may cause an increase in computational efficiency by avoiding decryption of certain messages and/or avoiding re-encryption of certain messages. The techniques described herein may also be used in a variety of contexts where different entities perform different operations of processes described herein. For instance, an application may not implement a secure communications channel itself. A hardware device that executes the application (e.g., operating system or application executing on an operating system) may, for instance, manage communications over a secure channel, such as by using a network interface card (NIC) or other hardware component. The hardware device may provide an interface to the application to enable the virtual computer system to obtain information received by the NIC. The NIC may be configured to selectively decrypt and/or to selectively avoid re-encryption in accordance with the techniques described above such that an application executing can further process information received from the NIC.

As yet another example, as noted, techniques described above are adaptable to HTTP and other requests that utilize chunked transfer encoding where an amount of data associated with a request is not identified initially. In some embodiments, data may be cached until an indication (e.g., chunk with zero length) of completion of the request is detected and the cached data may be transmitted to a data storage system in encrypted form (i.e., without reencryption). In other embodiments, chunks are transmitted to the data storage system in encrypted form as they are received and an indication of an end to the request may or may not be detected. In yet other examples, operations in addition to those described above may also be performed. For instance, in embodiments where not all records of a request are decrypted, records in sequence after the header of the request may be selectively decrypted to determine an end to the request, such as in embodiments where the request header does not specify a size or to verify that information in the request header indicating the size of the payload (and, therefore, indicating the end of the request) was correctly encoded in the header. Further, while various embodiments are described in connection with network communications, the techniques described herein may be adapted to other types of communications, such as intra-process and/or inter-process communications that do not traverse a computer network and that are configured in accordance with non-network protocols. Also, while various embodiments described herein use a data storage system as a destination for data of a request, other systems may receive the data instead of or in addition to a data storage system, such as a system that performs analysis or other processing on the data.

In addition to the foregoing, as noted, the techniques described herein are adaptable to contexts where the ultimate destination of data in a request is not necessarily a data storage system. In some embodiments, a server decrypts records to identify a request fulfillable by a backend service (e.g., by another server or multiple servers). The server may decrypt a set of records sufficient to determine the backend service (e.g., select the backend service from a set of backend services) and, without decrypting all the records, may transmit the request in encrypted form to the determined backend service. To enable the backend service to decrypt and process the request, the server may provide information sufficient to decrypt the request to the backend service. In the example of an SSL/TLS session being used to receive the request, the server may transmit session information (e.g., including a decryption key and perhaps a data integrity key) to the backend service. The session information may be transmitted, for instance, by encrypting the session information using a pre-shared secret (shared between the server and the backend service) or using another mechanism (e.g., by establishing a secure communications channel with the backend service if not already established.) In this manner, computational efficiency is achieved and computational load on the server is reduced. For instance, when the size of the SSL/TLS session information is smaller than the size of the original request, fewer computational resources are required to provide the request to the backend service and less memory is utilized.

As discussed, numerous variations utilize symmetric and/or asymmetric cryptographic primitives. Symmetric key algorithms may include various schemes for performing cryptographic operations on data, including block ciphers, stream ciphers and digital signature schemes. Example symmetric key algorithms include the advanced encryption standard (AES), the data encryption standard (DES), triple DES (3DES), Serpent, Twofish, blowfish, CAST5, RC4 and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

Figure 7:
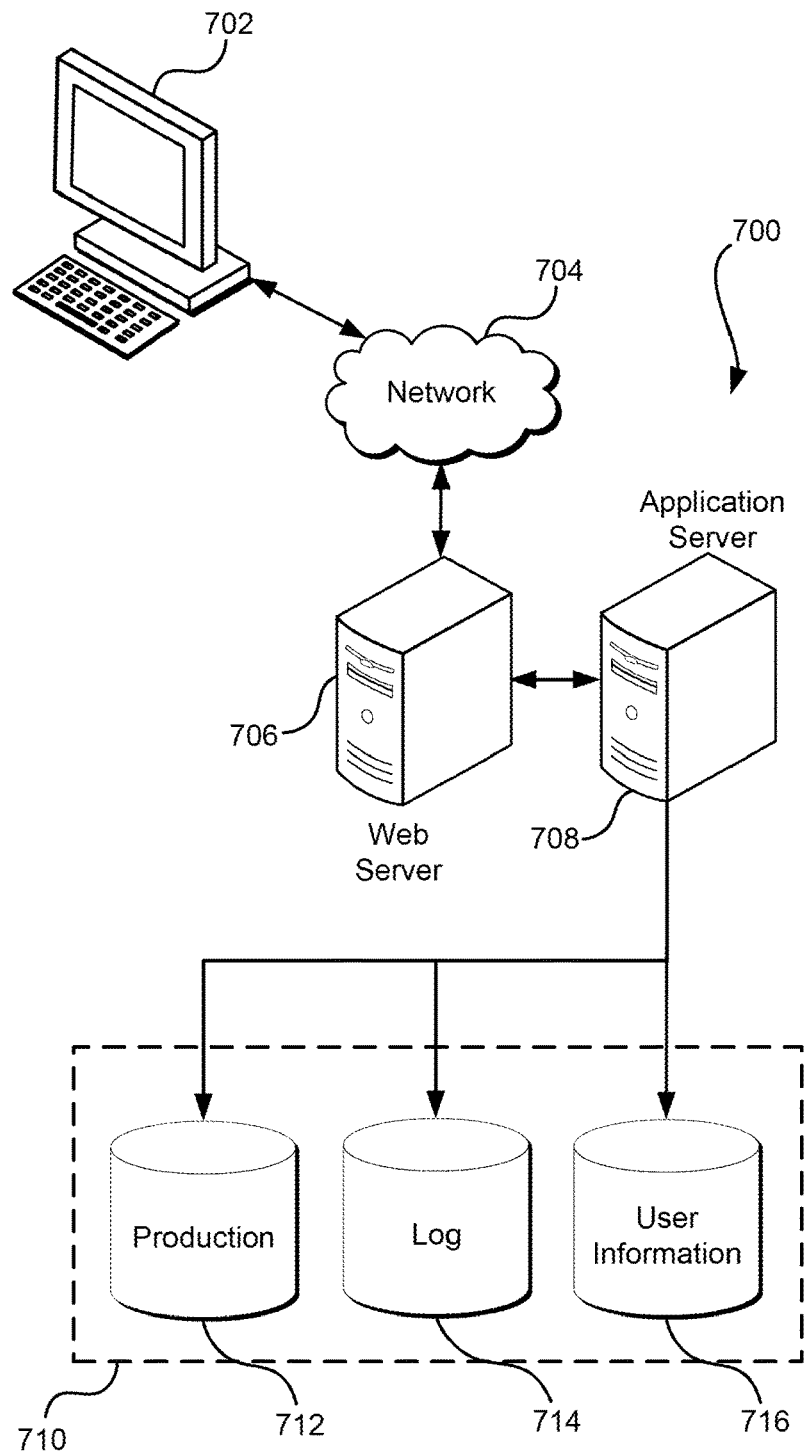
FIG. 7 illustrates an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 702 and the application server 708, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. The application server 708 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   establishing a secure communications channel with a second computer system, resulting in session information that includes a cryptographic key usable to decrypt encrypted records received over the secure communications channel;
   receiving, over the secure communications channel, a sequence of encrypted records, wherein individual records of the sequence of encrypted records are decryptable using the cryptographic key;
   decrypting, using the cryptographic key, a first subsequence of the sequence of encrypted records to form a decrypted first subsequence; and
   as a result of determining that the decrypted first subsequence indicates a request to store a second subsequence, distinct from the first subsequence, of the sequence of encrypted records, providing the second subsequence and the cryptographic key to a data storage system, thereby causing the second subsequence and the cryptographic key to be stored, the cryptographic key usable to decrypt the sequence.

2. The computer-implemented method of claim 1, wherein the second subsequence and the cryptographic key are stored without the second subsequence having been decrypted using the cryptographic key between receiving the sequence of encrypted records and providing the second subsequence to the data storage system.

3. The computer-implemented method of claim 1, wherein:
   establishing the secure communications channel comprises performing a handshake of a protocol that has a handshake protocol and a record protocol; and
   the sequence of encrypted records comprises individual records formatted in accordance with the record protocol.

4. The computer-implemented method of claim 1, wherein the first subsequence encodes at least part of a request to store data encoded in the second subsequence.

5. The computer-implemented method of claim 1, wherein determining the second subsequence comprises:
   obtaining, from the decrypted first subsequence, information that indicates a size of a data object to be stored; and
   calculating, based at least in part on the information obtained, a range of records that encodes the data object, wherein the second subsequence contains the range of records calculated.

6. A system, comprising:
   one or more processors; and
   memory including instructions that, as a result of execution by the one or more processors, cause the system to:
      receive a set of encrypted communications, wherein individual communications of the set of encrypted communications are decryptable using a cryptographic key;
      decrypt, using the cryptographic key, a first subset of the set of encrypted communications to form a decrypted first subset; and
      as a result of determining that the decrypted first subset of the set of encrypted communications indicates an operation to be performed on a second subset, distinct from the first subset, of the set of encrypted communications, provide the second subset and the cryptographic key.

7. The system of claim 6, wherein the cryptographic key is a symmetric cryptographic key.

8. The system of claim 6, wherein:
   the set of encrypted communications is a sequence of encrypted communications;
   the first subset of the set of encrypted communications is a first subsequence of the sequence; and
   the second subset of the set of encrypted communications is a second subsequence of the sequence.

9. The system of claim 6, wherein the first subset of the set of encrypted communications and the second subset of the set of encrypted communications have a nonempty intersection.

10. The system of claim 6, wherein the instructions cause the system to determine the second subset of the set of encrypted communications by causing the system to:
    obtain information about the second subset of the set of encrypted communications from the decrypted first subset; and
    use the information obtained to determine the second subset from the set of encrypted communications.

11. The system of claim 6, wherein the instructions that cause the system to produce the decrypted first subset cause the system to decrypt communications until the system detects a header of a request to store data.

12. The system of claim 6, wherein the set of encrypted communications:
    comprises communications formatted in accordance with a first protocol; and
    encodes a request formatted in accordance with a second protocol different from the first protocol.

13. The system of claim 6, wherein the instructions, as a result of execution by the one or more processors, cause the system to perform a handshake process with another computer system to determine the cryptographic key.

14. The system of claim 6, wherein:
    the instructions further cause the system to:
       establish a secure communication channel with a sender of the set of encrypted communications; and
       negotiate, as at least a part of a process of establishing the secure communications channel, the cryptographic key; and
    the set of encrypted communications are received over the secure communication channel from the sender.

15. The system of claim 6, wherein the instructions that cause the system to provide the second subset cause the system to provide, without decrypting, the second subset of the set of encrypted communications and the cryptographic key to a data storage system.

16. The system of claim 6, wherein the encrypted communications are formatted in accordance with a transport layer security record protocol.

17. A non-transitory computer-readable storage medium having stored thereon executable instructions that, as a result of execution by one or more processors of a computer system, cause the computer system to at least:
    decrypt, using session information that includes a cryptographic key, at least a first subset of a set of encrypted communications to determine that the set of encrypted communications collectively encodes a request and data; and
    as a result of determining that the set of encrypted communications collectively encodes the request, fulfill the request by, without further decrypting the set of encrypted communications, providing:
       a second subset of the set of encrypted communications that contains the data; and the cryptographic key, the cryptographic key usable to decrypt the second subset.

18. The non-transitory computer-readable storage medium of claim 17, wherein the executable instructions further comprise instructions that cause the computer system to negotiate session information with a sender of the set of encrypted communications.

19. The non-transitory computer-readable storage medium of claim 18, wherein the executable instructions that cause the computer system to provide at least the second subset of the set of encrypted communications further cause storage of at least the second subset of the set of encrypted communications and the cryptographic key.

20. The non-transitory computer-readable storage medium of claim 17, wherein the executable instructions further comprise instructions that cause the computer system to:
  decrypt the second subset of the set of encrypted communications to produce a decrypted second subset; and
  verify integrity of data encoded by the decrypted second subset.

21. The non-transitory computer-readable storage medium of claim 17, wherein the executable instructions further include instructions that cause the computer system to form the first subset of the set of encrypted communications by decrypting communications until determined that the first subset of the set of encrypted communications contains sufficient information to determine how to fulfill the request.

22. The non-transitory computer-readable storage medium of claim 17, wherein the second subset of the set of encrypted communications comprises at least one communication that was decrypted by the computer system.

23. The non-transitory computer-readable storage medium of claim 17, wherein:
  the second subset of the set of encrypted communications comprises multiple subsets that individually correspond to different data objects; and
  the executable instructions that cause the computer system to fulfill the request, as a result of execution by the one or more processors, cause the computer system to transmit the second subset of the set of encrypted communications such that the multiple subsets are stored as individual data objects.

24. The non-transitory computer-readable storage medium of claim 17, wherein the executable instructions that cause the computer system to fulfill the request, further cause the computer system to fulfill the request without decrypting at least one communication from the second subset of the set of encrypted communications.

25. The non-transitory computer-readable storage medium of claim 17, wherein the set of encrypted communications are records formatted in accordance with a record protocol.

26. The non-transitory computer-readable storage medium of claim 17, wherein the executable instructions further include instructions that cause the computer system to verify integrity of the data without decrypting at least a portion of the data.

27. The non-transitory computer-readable storage medium of claim 17, wherein the cryptographic key is a private key of a public/private key pair.

* * * * *